May 25, 1937.　　　　H. V. ATWELL　　　　2,081,130
DISTRIBUTION OF FUEL GASES

Filed Dec. 30, 1932

Inventor
Harold V. Atwell

BY Bruce K. Brown
ATTORNEY

Patented May 25, 1937

2,081,130

UNITED STATES PATENT OFFICE 2,081,130

DISTRIBUTION OF FUEL GASES

Harold V. Atwell, White Plains, N. Y., assignor to Standard Oil Company, Chicago, Ill., a corporation of Indiana Application December 30, 1932, Serial No. 649,534

9 Claims. (Cl. 48—190)

This invention relates to a process for inhibiting the formation of gums and semi-solid organic materials in the equipment used for distributing gaseous fuels, such as natural gas, manufactured gas, coal gas, water gas and the like, or mixtures of these gaseous fuels. Also other unsaturated gaseous hydrocarbons may be stabilized by my invention. This invention pertains more particularly to a process for inhibiting the formation and deposition of gums in gas meters and other gas regulating devices disposed in the gas lines.

In the process of distributing gases for domestic and industrial purposes, the unsaturated constituents of the gases tend to polymerize and/or oxidize and form gum. These gums and/or polymerized organic materials deposit in the distributing lines and on the moving parts of the meters used for measuring the flow of gas. This is particularly noticeable in the small meters used for measuring the flow of gas for domestic purposes. However, the same problem exists in all gas meters. At frequent intervals the meters must be dismantled and the gum and polymerized products removed in order to insure efficient metering.

The object of my invention is to provide a process for inhibiting the formation of these gums in the gas mains, meters and other equipment disposed in the distributing system.

Another object of my invention is to provide a method for dispersing gum inhibitors in gaseous fuels.

My invention will be more clearly understood in view of the following description when read in connection with the accompanying drawing in which.

Figures 1, 2:
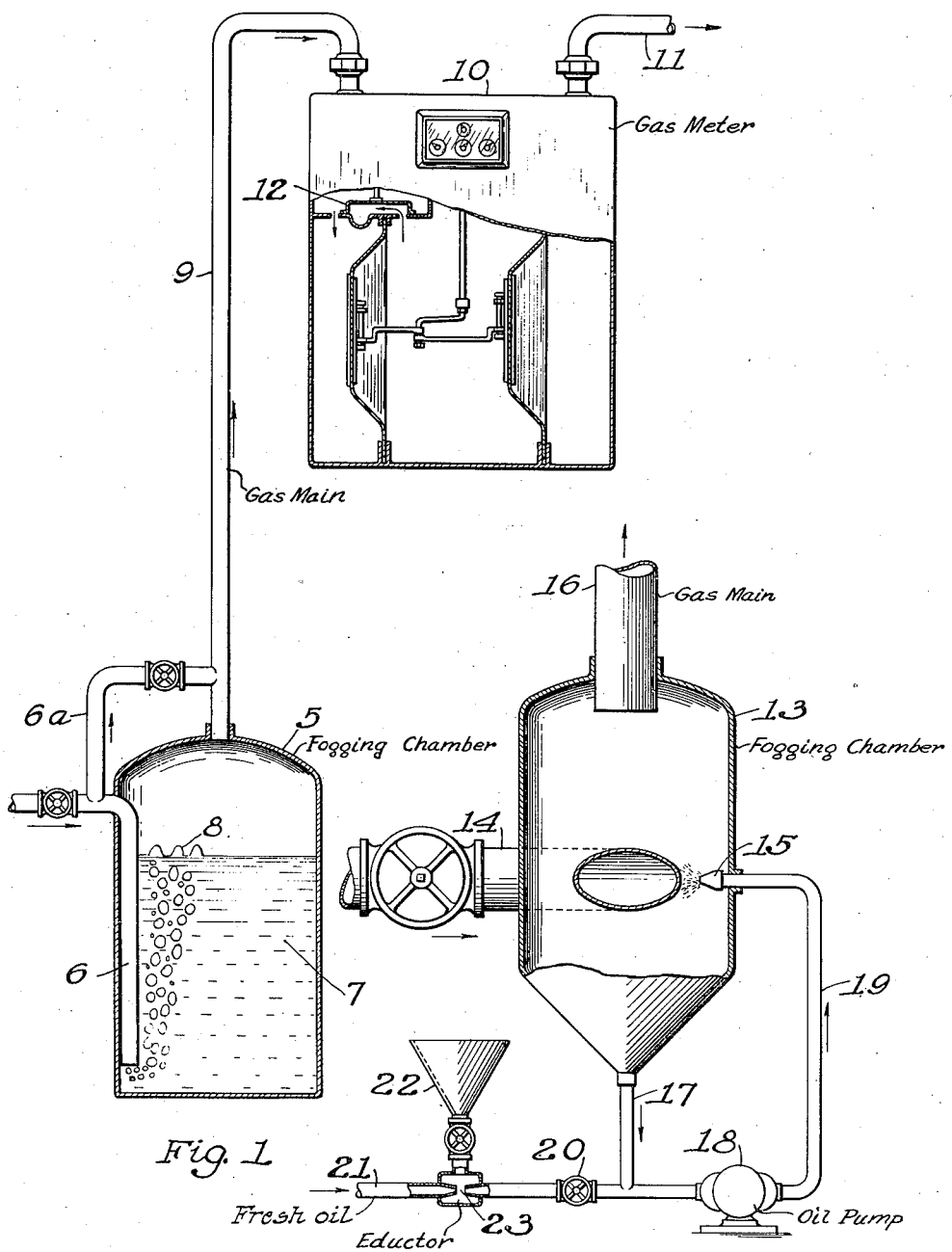
Figure 1 represents an elevational view, partly in section, of a gas meter and means for dispersing a fog or suspension of mineral oil containing an antioxidant into the gaseous fuel prior to admission to the meter.
Figure 2 represents an elevational view, partly in section, of an apparatus for dispersing a liquid antioxidant into the gaseous fuel.

The gases, such as manufactured gas, or a mixture of manufactured gas and natural gas are conveyed from the manufacturing plant or place of origin through gas mains, introduced into the chamber 5 through the valved conduit 6 and permitted to bubble through the light oil solution 7 containing an antioxidant. The bubbles of gas rise to the surface as shown in 8 and burst, thereby dispersing a small quantity of minute droplets of the solution of oil and antioxidants into the gas. The droplets form a fog or suspension in the gas stream and then leave the chamber 5 through the conduit 9 and pass into the meter 10. As the fog and gas pass through the meter and out the conduit 11 some of the oil solution of antioxidants deposit upon the various parts of the meter and particularly the moving parts shown at 12. Also the antioxidant inhibits gum formation on the inner surface of the conduit.

The chamber 5 is usually disposed in the line near the meter 10 and both the meter and chamber are maintained at substantially the same temperature which is usually the seasonal temperature. The oil which is used as a vehicle for the antioxidant may suitably be a petroleum oil, preferably with a relatively low viscosity, usually from 38 to 60 seconds Saybolt at 100° F. Instead of passing all of the gas through the chamber 5, part of the gas may be by-passed through the valved conduit 6a. The by-pass is particularly useful when large volumes of gases are to be treated, to prevent using too great an excess of antioxidant and making it possible to pass smaller quantities of gas through the oil. The amount of fog or small particles of oil dispersed in the gas may vary over a relatively wide range, depending upon the tendency of the gas to form gums, but generally the amount of oil dispersed in the gas will vary from one quart to five gallons per million cubic feet.

The amount of antioxidant added to the oil may also be varied over a relatively wide range, depending upon the effectiveness of the particular antioxidant and the relative tendency of the gas to form gum or polymerized products. For example, some antioxidants may be used in concentration from 1 to 5%, but usually 0.05 to 2% is the general range of concentration for the highly effective antioxidants. In the case of alpha naphthol I may use a 5% solution.

It is apparent that the devices shown in Figure 1 may be operated several ways. For example, the amount of antioxidant added to the oil may be as low as 0.01% to 0.5% and the amount of oil solution dispersed in the gas may be as high as 3 to 6 gallons per million cu ft. Also the concentration of antioxidant may be increased to 1 to 5% and the amount of oil dispersed may be decreased to 1 to 3 quarts per million cu. ft. of gas.

In preparing the oil solution of antioxidant it may be necessary with some of the antioxidants to add a blending agent to increase the solubility of the antioxidant in the oil. For example, the antioxidant may be dissolved in benzene, toluene, propyl or butyl ethers, high molecular weight alcohols, aniline, hexane, and the like or mixtures of these, and this solution is then added to the oil. Instead of using an oil solution of the antioxidant as hereinabove described I may use a liquid antioxidant such as wood tar distillate, creosote, beechwood tar distillate, mixtures of phenolic compounds, cresols, creosoles, aniline, and the like. When a liquid antioxidant is used, the amount of gas passed through the chamber 5 may be adjusted so that 1 to 100 grams of the antioxidant will be dispersed in the gas stream per million cu. ft. of gas. If the antioxidant to be used is not normally a liquid at the temperature of the operation, I may use a concentrated solution of the antioxidant in a suitable vehicle such as benzene, toluene, xylene and the like or mixtures of these.

The antioxidants particularly suitable for my invention are of the phenolic and amine types. Examples of antioxidants suitable for my invention are phenols such as cresols, wood tar distillates, beechwood tar distillates, wood creosotes, phenol, creosoles, guaiacols, alpha and beta naphthols; nitrosophenols such as ortho, meta and para nitrosophenols; polyhydroxy phenolic compounds such as hydroquinone, tertiary butyl catechol, chlorohydroquinone, pyrogallol, catechol, resorcinol, and the like; amino phenols such as ortho, meta and para amino phenols, 2-amino-5-hydroxytoluene, aminonaphthol, 4-amino alphanaphthol, 1-amino-2-naphthol, 6-amino-1-naphthol, 1-amino-10-anthranol, 2-amino-5-phenylphenol, 1-phenyl-2-amino-3-naphthol, 2-amino-4-benzylphenol, 2-amino-1, 4-dihydroxy benzene, 4-amino-1-2-dihydroxybenzene, and similar aminophenols containing a benzene or naphthalene nucleus. Substituted aminophenols such as alkyl aminophenols, for example methyl aminophenol, ethyl aminophenol, butyl aminophenol, dimethyl aminophenols, diethyl aminophenols, amylaminophenol, 4-n-amylaminophenol, 4-cyclohexylamino phenol, 4-n-hexylaminophenol, and the like; aryl aminophenol, for example, ortho, meta and para phenylaminophenol, and the like; aralkyl aminophenol, for example, ortho, meta and para benzyl aminophenol. Aromatic amines such as aniline, ortho, meta and para phenylenediamine, alpha and beta naphthylamine, toluidines, and the like; substituted aromatic amines such as alkyl anilines, methyl aniline, ethyl aniline, phenyl alphanaphthylamine, phenyl beta-naphthylamine, diphenylamine, alkyl phenylenediamines, methyl and/or ethyl phenylenediamines, triaminobenzenes, benzidine and the like. Also I may use mixtures of the above antioxidants, methyl aminophenol and benzyl aminophenol, methyl aminophenol and pyrogallol, catechol and cresols, alphanaphthol, and catechol and the like.

A modified form of my invention comprises the use of a method whereby the antioxidant is sprayed into the gaseous fuel to be stabilized. Figure 2 discloses one form of apparatus suitable for this process. The gaseous fuel enters the chamber 13 through the valved line 14. The liquid antioxidant or solution of antioxidant is sprayed into chamber 13 by the nozzle 15. A small quantity of the liquid antioxidant remains dispersed or suspended in the gas and passes from the chamber 13 through the conduit 16 to the distributing main. Any antioxidant which is not sufficiently dispersed in the gas is thrown against the walls of the chamber and settles to the bottom of the chamber 13 where it is recycled through the line 17, pump 18 and line 19. The fresh supply of anti-oxidant is introduced through the valved conduit 20. The fresh antioxidant may be added in a liquid form or in a solution in oil through the line 21 or it may be introduced as a powder through the hopper 22 from which it falls on to a jet of oil supplied by nozzle 23. In this embodiment of my invention the dispersion of antioxidant is usually added to the gas at the place of manufacture or at some central distributing point and not necessarily at the place of consumption. Liquid antioxidants which may be used are aniline, creosote, cresols, wood tar distillate, and liquid substances hereinbefore mentioned. Solutions of antioxidants in oils, or high molecular weight alcohols may be used. Any of the hereinbefore mentioned antioxidants may be used in this modification of my invention. The apparatus shown in Figure 2 may be adjusted so that about 3 to 5 gallons of oil containing about 0.05 to 1% of antioxidant will be dispersed in about 1,000,000 cu. ft. of gas. However, it should be understood that varying concentrations may be used, depending upon the amount of unsaturated compounds in the gas and the tendency of the gas to form gums and polymerized products.

As a third modification of my invention the antioxidants may be dissolved in a hot solution of mineral oil such as a straw oil which has a Saybolt viscosity of 65 to 95 seconds at 100° F. The gas is bubbled through this hot solution and a small quantity of the oil containing an antioxidant will be dispersed in the gas stream. The oil solution is maintained at about 400 to 470° F. However, lower temperatures may be used if desired. After the gas has cooled, the oil solution forms a fog which remains dispersed in the gas for a long period of time. Generally this process of fogging is employed to stabilize the gas at the place of manufacture or some central point of distribution.

In any of the hereinbefore methods of dispersing small droplets of oil containing antioxidants or small droplets of liquid antioxidants in the gas stream, the dispersed phase settles upon the moving parts of the gas meters and equipment disposed in the distributing lines and thereby prevents the formation of gum thereon. By using a fogging oil as a method for distributing the antioxidant in the gas, the fog also serves to eliminate the formation of dust in the distributing lines and helps to close up small leaks.

The specific description set forth in connection with the several modifications of my invention are not to be construed as a limitation thereon except insofar as these limitations are set forth in the appended claims.

I claim:

1. The process for inhibiting gum formation in combustible gaseous fuels containing unsaturated organic compounds, which comprises dispersing a fog of oil containing an antioxidant into said gaseous fuel.

2. The process for inhibiting gum formation in combustible gases containing unsaturated compounds, comprises dispersing a fog of oil containing a phenolic antioxidant into said gaseous fuel.

3. The process for preventing gum formation in metering devices disposed in conduits for conveying combustible gases containing unsaturated compounds, which comprises dispersing a fog of oil into said gas, said fog of oil containing an aminophenol.

4. The process of inhibiting the deposition of gums in apparatus used for handling combustible gases containing gum forming compounds, which comprises dispersing a fog of a light mineral oil into said gas, said dispersed oil containing a small amount of para-benzyl-aminophenol.

5. The process for inhibiting gum formation in combustible gases containing compounds that form gum, which comprises contacting combustible gases containing gum-forming compounds with a body of hot mineral oil containing a small amount of a hydroxy benzene compound dissolved therein whereby a portion of the solution of hot oil and hydroxy benzene compound is dispersed in vapor form into said gas, and then adding said gas along with the dispersed solution of hot oil and hydroxy benzene compound to combustible gases containing gum-forming compounds to form a fog of the solution of oil and hydroxy compound therein.

6. The process for inhibiting gum formation in combustible gases containing compounds that form gum, which comprises contacting combustible gases containing gum-forming constituents with a body of hot mineral oil containing a small amount of alphanaphthol dissolved therein whereby a portion of the solution of hot oil and alphanaphthol is dispersed in vapor form into said gas, and then adding said gas with the dispersed solution of hot oil and alphanaphthol to combustible gases containing gum-forming compounds to form a fog of the solution of oil and alphanaphthol therein.

7. The process for inhibiting gum formation in combustible gases containing compounds that form gum, which comprises contacting some of the combustible gases containing gum-forming compounds with a hot mineral oil having a viscosity ranging from 38 to 60 seconds Saybolt at 100° F. and a small amount of a hydroxy benzene compound dissolved therein, whereby a proportion of said hot oil and hydroxy benzene compound is dispersed in vapor form into said gas, and then adding said gas with the dispersed solution of hot oil and hydroxy benzene compound to combustible gases containing gum-forming compounds to form a fog of the solution of said mineral oil and hydroxy benzene compound therein.

8. The process for inhibiting gum formation in combustible gases containing compounds that form gum, which comprises contacting combustible gases containing gum-forming constituents with a body of hot straw oil containing a small amount of a phenol dissolved therein whereby a portion of the solution of hot straw oil is dispersed in vapor form into said gas, and then adding said gas along with the dispersed solution of hot straw oil to combustible gases containing gum-forming compounds to form a fog of the solution of straw oil therein.

9. The process for inhibiting gum formation in combustible gases containing compounds that form gum, which comprises bubbling combustible gases containing gum-forming constituents through a body of hot mineral oil containing a small amount of a hydroxy benzene compound dissolved therein, whereby a portion of the solution of hot oil and hydroxy benzene compound is dispersed in vapor form into said gas, and then adding said gas with the dispersed solution of hot oil and hydroxy benzene compound to combustible gases containing gum-forming constituents to form a fog of the solution of oil and hydroxy benzene compound therein.

HAROLD V. ATWELL.